United States Patent
Michalowski et al.

(10) Patent No.: US 9,421,688 B2
(45) Date of Patent: Aug. 23, 2016

(54) ROBOT

(71) Applicant: Beatbots, LLC, San Francisco, CA (US)

(72) Inventors: Marek P. Michalowski, San Francisco, CA (US); Gregory R. Katz, San Francisco, CA (US); Thiago G. Hersan, Pittsburgh, PA (US)

(73) Assignee: Beatbots, LLC, San Francisco, CA (US)

( * ) Notice: Subject to any disclaimer, the term of this patent is extended or adjusted under 35 U.S.C. 154(b) by 0 days.

(21) Appl. No.: 14/568,846

(22) Filed: Dec. 12, 2014

(65) Prior Publication Data

US 2015/0165625 A1   Jun. 18, 2015

Related U.S. Application Data

(60) Provisional application No. 61/915,253, filed on Dec. 12, 2013.

(51) Int. Cl.
  *B25J 9/16* (2006.01)
  *G06N 3/00* (2006.01)

(52) U.S. Cl.
  CPC ..... *B25J 9/1694* (2013.01); *G05B 2219/40253* (2013.01); *G05B 2219/40414* (2013.01); *G05B 2219/40625* (2013.01); *G06N 3/008* (2013.01); *Y10S 901/47* (2013.01); *Y10S 901/50* (2013.01)

(58) Field of Classification Search
  CPC .................. B25J 9/1694; G06F 3/01
  See application file for complete search history.

(56) References Cited

U.S. PATENT DOCUMENTS

| | | | | |
|---|---|---|---|---|
| 6,347,261 B1 * | 2/2002 | Sakaue | ................. | B25J 9/1694 345/156 |
| 6,373,265 B1 * | 4/2002 | Morimoto | ............ | G01D 5/2417 324/661 |
| 8,441,467 B2 * | 5/2013 | Han | ................... | G06F 3/04883 178/18.09 |
| D714,881 S | 10/2014 | Michalowski et al. | | |
| D714,883 S | 10/2014 | Michalowski et al. | | |
| D714,888 S | 10/2014 | Kasznica et al. | | |
| 9,002,768 B2 * | 4/2015 | Fedorov | ..................... | G06F 3/01 345/156 |
| 9,224,273 B1 * | 12/2015 | Atkinson | .............. | G07F 19/201 |
| 2009/0090305 A1 * | 4/2009 | Cheok | ................... | A01K 15/02 119/707 |
| 2011/0137137 A1 * | 6/2011 | Shin | ..................... | A61B 5/0059 600/301 |
| 2013/0078600 A1 * | 3/2013 | Fischer | .................. | G09B 19/00 434/236 |
| 2013/0154980 A1 * | 6/2013 | Byrnes | ...................... | G06F 3/01 345/173 |
| 2014/0035603 A1 * | 2/2014 | Ray | ......................... | G01L 1/205 324/693 |
| 2014/0371954 A1 * | 12/2014 | Lee | ......................... | G08C 17/02 701/2 |
| 2015/0100157 A1 * | 4/2015 | Houssin | .............. | G10L 15/1815 700/246 |
| 2015/0165336 A1 | 6/2015 | Michalowski et al. | | |
| 2015/0277617 A1 * | 10/2015 | Gwin | ...................... | G06F 3/044 345/174 |

FOREIGN PATENT DOCUMENTS

WO   WO 2013/072712 A1   5/2013

OTHER PUBLICATIONS

Breazeal, Cynthia L., "Designing Sociable Robots," MIT Press, 2004.

* cited by examiner

*Primary Examiner* — Nicholas Kiswanto
(74) *Attorney, Agent, or Firm* — K&L Gates LLP

(57) ABSTRACT

A robot is disclosed. The robot can comprise a body and an emotion-expressing system. The emotion-expressing system can comprise a touch sensor embedded within the body, a feedback generator, and a controller in communication with the touch sensor and the feedback generator. The controller can be configured to determine the emotional state of the robot based on feedback from the touch sensor, and the feedback generator can be configured to generate feedback indicative of the emotional state.

20 Claims, 6 Drawing Sheets

ROBOT

CROSS-REFERENCE TO RELATED APPLICATION

This application claims the benefit under 35 U.S.C. §119(e) of U.S. Provisional Patent Application No. 61/915,253, entitled ROBOT, filed Dec. 12, 2013, which is incorporated by reference herein in its entirety.

TECHNICAL FIELD

The present disclosure relates to robots having interactive interfaces and systems and methods for using and creating such robots.

BACKGROUND

In at least one embodiment, the present disclosure provides a mechanism and/or system for an interactive robot to detect and infer differences between various kinds of touch.

In at least one embodiment, the present disclosure provides a mechanism and/or system for an interactive robot to generate appropriate affective responses to detected touch inputs.

The foregoing discussion is intended only to illustrate various aspects of certain embodiments disclosed in the present disclosure, and should not be taken as a disavowal of claim scope.

BRIEF DESCRIPTION OF THE DRAWINGS

Various features of the embodiments described herein are set forth with particularity in the appended claims. The various embodiments, however, both as to organization and methods of operation, together with the advantages thereof, may be understood in accordance with the following description taken in conjunction with the accompanying drawings as follows:

The exemplifications set out herein illustrate various embodiments, in one form, and such exemplifications are not to be construed as limiting the scope of the appended claims in any manner.

DETAILED DESCRIPTION

Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and illustrative. Variations and changes thereto may be made without departing from the scope of the claims.

The terms "comprise" and any form of comprise, such as "comprises" and "comprising"), "have" and any form of have, such as "has" and "having"), "include" and any form of include, such as "includes" and "including") and "contain" and any form of contain, such as "contains" and "containing") are open-ended linking verbs. As a result, a system, device, or apparatus that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The present disclosure relates to a novel and unique robot. In various instances, the present disclosure relates to an emotionally-expressive and/or communicative robot. In certain instances, the present disclosure relates to a robot that is touch-sensitive, and can communicate emotions and/or mood with feedback generators. For example, the present disclosure describes an interactive robotic interface that can detect the direction and pressure of touch on the robot's body, and can respond to the nature of this touch through the generation of light, sound, and/or movement.

Figure 1:
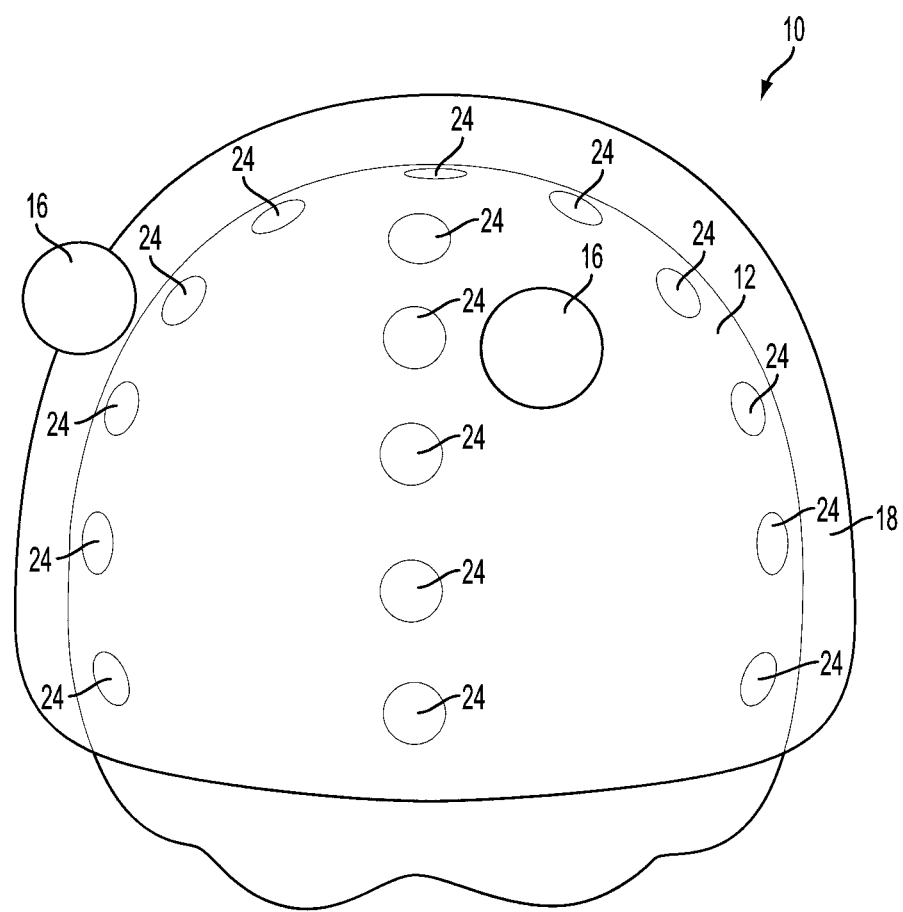
FIG. 1 is a perspective view of a robot, according to various embodiments of the present disclosure.
Figure 2:
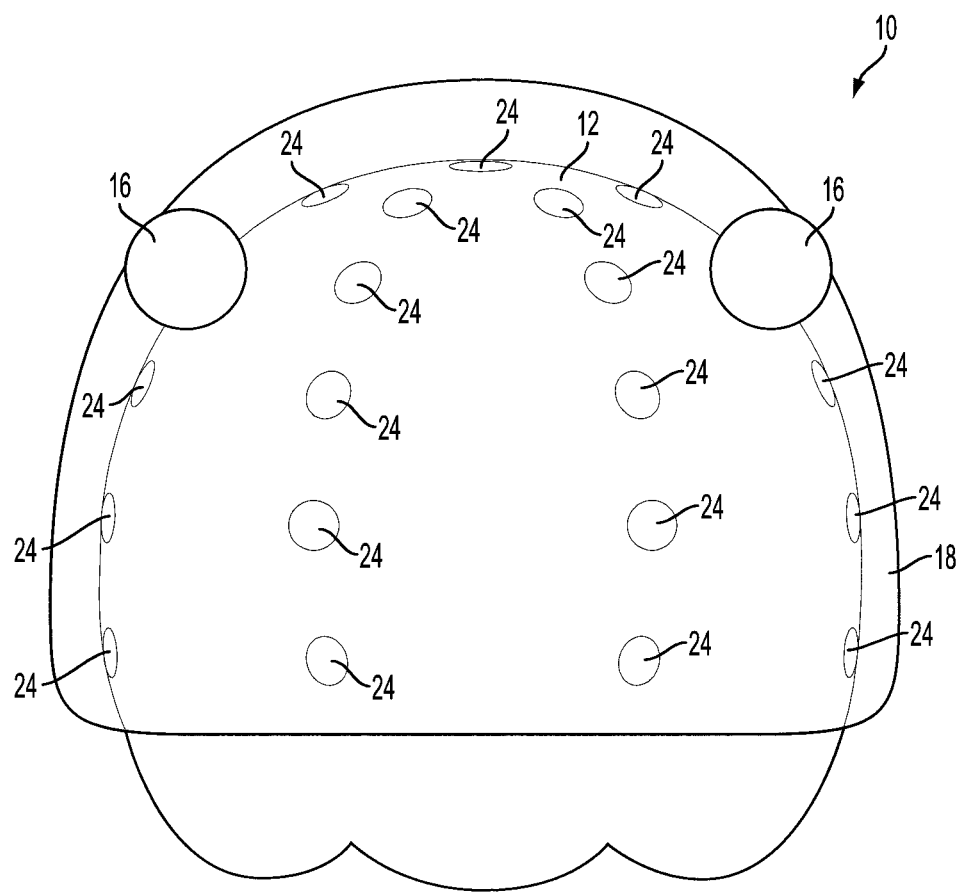
FIG. 2 is an elevation view of the robot of FIG. 1, according to various embodiments of the present disclosure.
Figure 3:
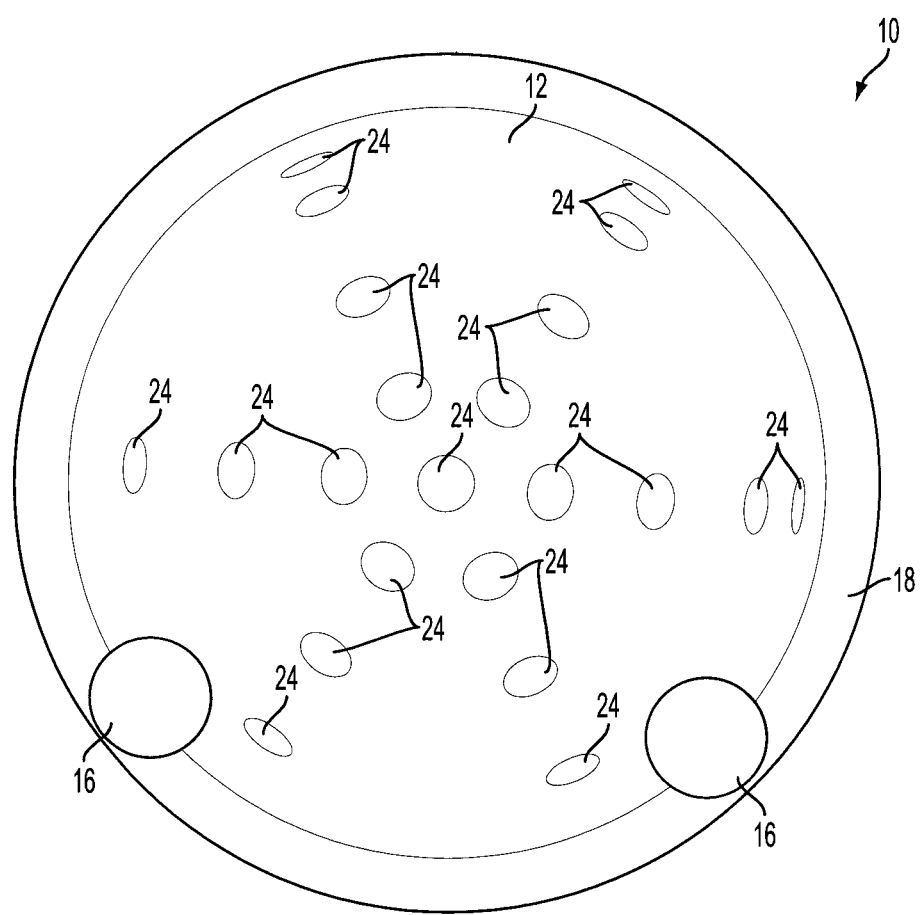
FIG. 3 is a plan view of the robot of FIG. 1, according to various embodiments of the present disclosure.

Referring to FIGS. 1-4, a robot 10 is depicted. The robot 10 includes a body 12, and can include additional features and/or elements supported on and/or extending from the body 12. A transparent or semi-transparent shell 18 can be positioned around at least a portion of body 12. Referring primarily to FIGS. 1-3, the robot 10 can includes eyes 16, which are supported on the shell 18. The body 12 of the robot 10 depicted in FIGS. 1-4 defines a dome-shaped body. The body 12 can be deformable. For example, the dome-shaped body 12 can be comprised of a rubber and/or rubber-like material, such as silicone rubber, for example, which can be configured to deform in response to external forces and/or touches, for example.

The reader will further appreciate that the robot 10 can comprise various different shapes and/or styles. For example, the robot 10 can comprise a toy, such as the robotic toys disclosed in U.S. Design Pat. No. D714,881, entitled ROBOT, which issued on Oct. 7, 2014; U.S. Design Pat. No. D714,883, entitled ROBOT, which issued on Oct. 7, 2014; and U.S. Design Pat. No. D714,888, entitled ROBOT, which issued on Oct. 7, 2014, which are hereby incorporated by reference herein in their respective entireties. In various instances, the robot 10 can include additional features, such as additional facial features and/or body parts. Additionally or alternatively, the robot 10 can include various colors and/or designs. Moreover, the robot 10 can include additional control mechanisms, such as the various actuation systems disclosed in contemporaneously-filed U.S. patent application Ser. No. 14/568,821, entitled ROBOT, now published as U.S. Patent Application Publication No. 2015-0165336, which is hereby incorporated by reference herein in its entirety.

Figure 4:
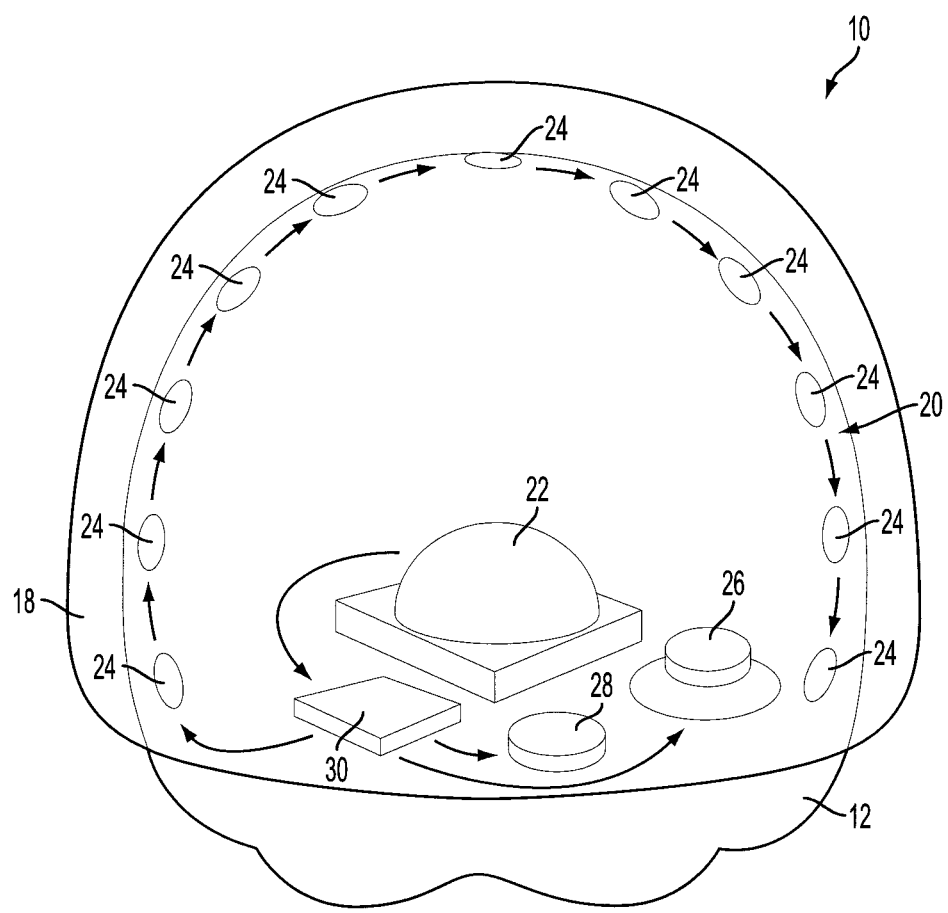
FIG. 4 is an elevation view of the robot of FIG. 1 with various elements removed and various elements shown in transparency for illustrative purposes, depicting an emotion-expressing system, according to various embodiments of the present disclosure.

Referring primarily to FIG. 4, the robot 10 includes an affective or emotion-expressing system 20. In various instances, the emotion-expressing system 20 can be at least partially embedded and/or encased within the body 12. The emotion-expressing expressing system 20 depicted in FIG. 4 includes a touch sensor 22, which is positioned in the center of the body 12. In various instances, the emotion-expressing system 20 can include a plurality of touch sensors 22. The touch sensor 22 is configured to detect the pressure, the location and/or the direction, i.e., angle, of externally-applied forces. For example, the touch sensors) 22 can be embedded within the body 12, and can detect forces on various external surfaces of the body 12 and/or the robot 10.

In at least one embodiment, the touch sensor 22 can be implemented with an OptoForce sensor. For example, the touch sensor 22 can be an optical sensor, as described in International Patent Application Publication No. WO 2013/072712 A1, entitled SENSOR DEVICE, filed on Nov. 16, 2012, which is hereby incorporated by reference herein in its entirety. The touch sensor 22 can detect the relative movement of LEDs and/or photosensors embedded and arranged in a cavity defined in a rubber body.

In various instances, an emotion-expressing system can include feedback generators, which can be configured to emit visual, tactile, and/or auditory feedback, for example, based on the forces) detected by the touch sensors) 22. For example, an emotion-expressing system can include at least one light, at least one speaker and/or at least one actuator. Referring again to the affective system 20 depicted in FIG. 20, the system 20 includes a plurality of lights 24, a speaker 26, and an actuator 28, which can provide multimodal feedback to interactants, e.g., people who interact with the robot 10. The speaker 26 can be positioned on the body 12, such as on the bottom and/or underside of the body 12, for example.

In various instances, the lights 24 can be arranged on the body 12. For example, an array of lights can be embedded below the surface and/or skin of the body 12. As depicted in FIGS. 1-3, the lights 24 can be arranged in a plurality of columns and/or lines. For example, the lights 24 can be arranged in a plurality of columns extending downward from the top of the dome-shaped body 12. A single light 24 can be positioned at the top of the dome-shaped body 12. In such instances, the lights 24 can form star-shaped arrangement when viewed from the top see FIG. 3). The lights 24 can be symmetrically arranged around the body 12, for example. In certain instances, the lights 24 can be arranged in at least one cluster and/or can be randomly positioned around the body 12. In various instances, the lights 24 can comprise light-emitting diodes LEDs), for example. In certain instances, the lights 24 can comprise addressable color-controllable LEDs, for example. In at least one embodiment, the lights 24 can be implemented with WS2812B LEDs.

In certain instances, the actuator 28 can comprise a vibrator, which can be embedded within the body 12 of the robot 10. For example, the vibrator 28 can be positioned in the center of the body 12. The vibrator 28 can include a rotary motor with an off-center weight on its shaft, for example. In at least one embodiment, the vibrator 28 can be implemented with a Precision Microdrives 310-101 motor. Additionally or alternatively, an actuator of the emotion-expressing system 20, can include a rotary and/or linear actuator, which can be configured to move and/or deform the body 12 of the robot 10 and/or elements thereof in response to touch.

Figure 5:
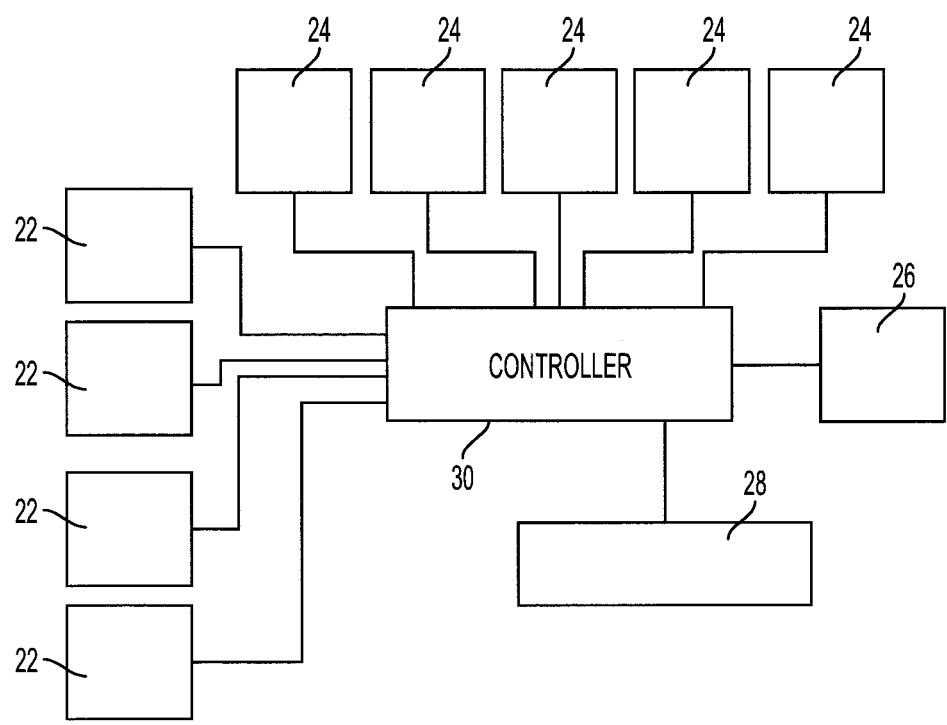
FIG. 5 is a schematic depicting a control system for the robot emotion-expressing system of FIG. 4, according to various embodiments of the present disclosure.

Referring now to FIGS. 4 and 5, the emotion-expressing system 20 can include a controller 30, which can be in communication with the touch sensors) 22 and the feedback generators 24, 26, and 28. For example, the touch sensors) 22 can communicate the detected magnitude, direction, and position of the external force to the controller 30. Software on a controller 30 can process data from the sensors) 22 and provide localized touch feedback. For example, the lights 24 in the vicinity of the location of an applied force can glow to indicate awareness of the touch. Furthermore, the controller 30 can integrate the recent history of applied touches to place the robot 10 in an emotional state that mediates the nature of the expressed feedback. In at least one embodiment, the controller 46 can be implemented with an Arduino Micro microcontroller board.

Figure 6:
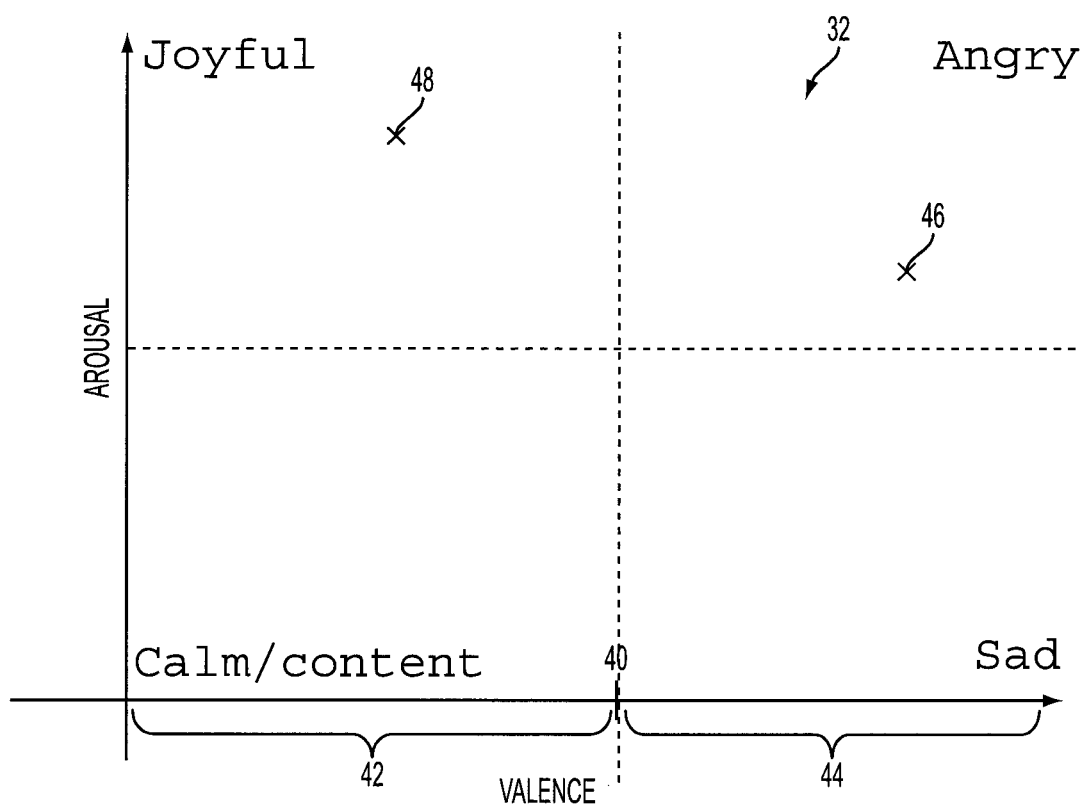
FIG. 6 is an emotional state graph, according to various embodiments of the present disclosure.

Emotional state is defined as a location in a multi-dimensional space with axes representing various characteristics of emotion. In various instances, the emotional state of the robot 10 can shift with each new touch. Referring to FIG. 6, an emotional state graph 32 is depicted. The emotional state of the robot 10 can be defined within the two-dimensional plane of the emotional state graph 32. In other instances, the emotional state can be defined by three or more dimensions.

Touches detected by the touch sensor 22 can shift and/or update the position of the robot's 10 emotional state on the emotional state graph 32. Referring still to FIG. 6, an axis on the graph 32 corresponds to valence, which can refer to the favorableness of the touch. The valence spectrum can include positive touches in region 42 and negative touches in region 44. A neutral region or point 40 can be intermediate the position region 42 and the negative region 44. The other axis on the graph 32 corresponds to arousal, which refers to the level of activity. The arousal spectrum can increase from no arousal to heightened arousal. Emotional modeling based on valence and arousal is further described in "Designing Sociable Robots" by Cynthia L. Breazeal, MIT Press 2004), which is hereby incorporated by reference herein in its entirety.

The sensor 22 can be configured to detect the force applied to the robot 10. For example, the sensor 22 can determine whether the detected force is associated with a light, gentle touch or a hard, abrupt touch. In various instances, the detected force of the touch can correspond to valence. For example, lighter touches, such as a gentle stroke, for example, can correspond to a positive valence value in region 42 of the graph 32. Moreover, harder touches, such as an abrupt punch, for example, can correspond to a negative valence value in region 44 of the graph 32.

In certain instances, the sensor 22 in combination with the controller 30 can be configured to detect the frequency and/or timing of touches. For example, the controller 30 can store and/or access information regarding previous touches and can determine if the detected touches are associated with constant pressure or a sequence of touches, such as pokes, for example. In various instances, the frequency and/or timing of the touches can correspond to arousal. For example, constant pressure can correspond to a lower arousal level while a sequence of touches can correspond to a heightened arousal level.

The combination of valence and arousal can determine the emotional state of the robot 10. For example, when the robot 10 is highly aroused by positive valence touches, e.g., frequent, low-pressure pokes, the emotional state of the robot 10 can be joyful as depicted in the upper, right corner of the graph 32 in FIG. 6. Referring still to FIG. 6, when the robot 10 is highly aroused by negative touches, e.g., frequent, high-pressure pokes, the emotional state of the robot 10 can be angry. If the arousal level of the robot 10 is low but the touches are positive, e.g., infrequent, low-pressure touches, the emotional state of the robot 10 can be calm and content, as depicted in the lower, right corner of graph 32 in FIG. 6. Referring still to FIG. 6, if the arousal level is low and the touches are strong and/or hurtful, e.g., infrequent, high-pressure touches, the emotional state of the robot 10 can be sad.

The controller 30 can be configured to adjust the emotional state of the robot 10 based on the detected touches. For example, negative touches can shift the robot's 10 emotional state toward, into, and/or further into the negative region 44 and away from and/or out of the positive region 42. Positive touches can shift the robot's 10 emotional state toward, into, and/or further into the positive region 42 and away from and/or out of the negative region 44. Moreover, the change in emotional state can be greater when the arousal level is higher, and can be less when the arousal level is lower.

The feedback generators 24, 26, and 28 of the emotion-expressing system 20 can display qualities reflective and/or expressive of the emotion state and/or changes thereto. For example, harder touches can be configured to shift the robot toward a "negative" emotional state, while repetitive soft touches might place the robot in a "positive" emotional state. Referring again to FIG. 6, the robot 10 can be in a first emotional state at location 46 on the emotional state graph 32. If the sensor 22 of the emotion-expressing system 20 detects a strong, negative touch, the robot's 10 emotional state can shift to location 48, for example.

In various embodiments, touch can be applied to various points on the body 12 of the robot 10. The touch can be recognized by the sensors) 22 described herein. Information about the pressure and direction of the applied forces can be continuously and/or repeatedly sent to the controllers) 30. In various instances, the controller 30 can estimate the location on the body 12 from which the externally-applied touch would have produced the sensed force. The controller 30 can feed the information regarding the location, magnitude, and/or direction of the force to an algorithm and/or software package, which can adjust the emotional state of the robot 10 based on the touch. Moreover, the controller can direct the feedback generators 24, 26, and/or 28 to communicate the updated emotional state.

The color, intensity, and spatiotemporal growth of the patterns can be determined by the emotional state. In one embodiment, the pressure of touch inversely influences the valence component of the emotional state, for example, and the quantity or frequency of touch influences the arousal component of the emotional state, for example. For example, the controller 30 can initiate visual patterns to be displayed on the lights 24 below the surface of the body 12, with an appropriate mapping between the address of each light 24 and its location on the body 12. The starting location of the patterns can determined by the most recent location of touch, for example. In certain instances, a touch of a short duration, such as a poke, for example, can result in a shockwave of illuminated lights 24 from the point of contact. Additionally or alternatively, consistent pressure at a point of contact can result in light in the specific region, which can expand during the duration of the touch.

In certain instances, the color, intensity, and/or duration of the lights 24 can suggest the emotional state of the robot 10. The controller 30 can direct the lights to be illuminated in a series of light-emitting patterns indicative of the emotion state. For example, the controller 30 can be configured to adjust the color, movement, and pace of the lights. In certain instances, in response to a harder touch, such as a punch, for example, the controller 30 can direct the lights 24 to light up with a color suggestive of pain, such as red hues, for example. Moreover, in response to soft, repetitive touches, such as light strokes, for example, the controller 30 can direct the lights 24 to light up with a color suggestive of comfort, such as blue hues, for example.

In certain instances, the color of the lights 24 can correspond to the mood of the robot 10. For example, a different color and/or series of colors can correspond to the four mood quadrants shown in FIG. 6, i.e., calm/content, sad, angry, and joyful. In various instances, the color blue can correspond to calmness and contentment. For example, when the robot 10 is calm and content, the lights 24 can pulse a shade of blue at a slow and steady rate. Purple, for example, can signify gloom and darkness and thus, be associated with sadness. For example, when the robot 10 is sad, the lights 24 can pulse a purple hue slowly and inconsistently. In certain instances, red can be associated with anger to signify alarm and/or to communicate "stop". When the robot 10 is angry, the lights 24 can pulse a red hue rapidly and inconsistently. In various instances, the joyful state of the robot 10 can correspond to the color yellow, which is associated with happiness and energy. When the robot 10 is joyful, the lights 24 can be configured to pulse a yellow hue at a frequent and steady rate. In certain instances, the robot 10 can be configured to generate a pattern of fast-paced, rainbow-colored lights when the pinnacle of extreme joyfulness is experienced.

In various instances, the sounds produced by the speaker 26 can be generated from simple sound blocks, such as sinusoids and/or pre-recorded waveforms, for example. The sounds can be modulated and/or repeated according to the emotional state of the robot 10. In one embodiment, the slope of the overall prosodic or pitch envelope can be determined by the valence component, for example, and the frequency and quantity of sound blocks can be determined by the arousal component of the emotional state. For example, the pitch of sounds from the speaker 26 can move through a sequence from a low pitch to a high pitch as the valence shifts from the neutral position 40 to an increasingly positive valence level in region 42. Additionally, the pitch of sounds from the speaker 26 can move through a sequence from a low pitch to a high pitch as the valence shifts from the neutral position 40 to an increasingly negative valence level in region 44. Additionally, the output frequency of sounds from the speaker 26 can increase and the duration of sounds from the speaker can decrease as the robot 10 becomes more aroused, for example, and the output frequency of sounds from the speaker 26 can decrease and the duration of sounds from the speaker can increase as the robot 10 arousal level decreases, for example.

The actuator 28 can also be in communication with the controller 30 and can respond to the emotional state of the robot 10. For example, the actuator 28 can be actuated when the sensor 22 detects a touch, and the intensity of the vibrations and/or movements can be controlled by pulse-width-modulation PWM) according to the detected pressure applied to the body 12.

While the present disclosure has been described as having certain designs, the various disclosed embodiments may be further modified within the scope of the disclosure. This application is therefore intended to cover any variations, uses, or adaptations of the disclosed embodiments using its general principles. Further, this application is intended to cover such departures from the present disclosure as come within known or customary practice in the relevant art.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

We claim:

1. An emotionally-expressive robot configured to respond to touches by an interactant, wherein the emotionally-expressive robot comprises:
   a body comprising a deformable portion and a non-planar outer surface; and
   an emotion-expressing system, comprising:
      an internal touch sensor embedded within the body, wherein the deformable portion of the body is positioned intermediate the internal touch sensor and at least a portion of the non-planar outer surface, and wherein the internal touch sensor is configured to detect externally-applied forces at a plurality of non-planar locations on the non-planar outer surface through the deformable portion;
      a feedback generator; and
      a controller in communication with the internal touch sensor and the feedback generator, wherein the controller is configured to determine an emotional state of the robot based on feedback from the internal touch sensor, and wherein the feedback generator is configured to generate feedback indicative of the emotional state.

2. The emotionally-expressive robot of claim 1, wherein the touch sensor comprises an optical sensor.

3. The emotionally-expressive robot of claim 1, wherein the feedback generator comprises a light positioned on the non-planar outer surface of the body.

4. The emotionally-expressive robot of claim 3, wherein the light comprises an LED.

5. The emotionally-expressive robot of claim 1, wherein the feedback generator comprises an actuator.

6. The emotionally-expressive robot of claim 5, wherein the actuator comprises a vibrator.

7. The emotionally-expressive robot of claim 1, wherein the feedback generator comprises a speaker.

8. The emotionally-expressive robot of claim 1, wherein the emotional state of the robot corresponds to a location on a two-dimensional graph.

9. The emotionally-expressive robot of claim 8, wherein a first dimension of the graph corresponds to valence, and wherein a second dimension of the graph corresponds to arousal.

10. The emotionally-expressive robot of claim 1, wherein the body comprises a deformable material.

11. An interactive robot, comprising:
   a deformable body comprising a non-planar shell;
   an internal touch sensor positioned inside the non-planar shell of the deformable body, wherein the touch sensor is configured to detect a location, a direction, and a magnitude of a force applied to the non-planar shell through the deformable body;
   a controller in communication with the touch sensor; and
   a feedback generator in communication with the controller, wherein the feedback generator is configured to generate feedback based on the location, the direction, and the magnitude of the force detected by the internal touch sensor.

12. The interactive robot of claim 11, wherein the touch sensor comprises an optical sensor.

13. The interactive robot of claim 11, wherein the feedback generator comprises a light positioned on an outer surface of the body.

14. The interactive robot of claim 13, wherein the light comprises an LED.

15. The interactive robot of claim 11, wherein the feedback generator comprises an actuator.

16. The interactive robot of claim 15, wherein the actuator comprises a vibrator.

17. The interactive robot of claim 11, wherein the feedback generator comprises a speaker.

18. A robot, comprising:
   a body comprising a deformable portion and a non-planar exterior; and
   an emotion-expressing system, comprising:
      an internal touch sensor embedded within the body, wherein the deformable portion of the body is positioned intermediate the internal touch sensor and at least a portion of the non-planar exterior, and wherein the internal touch sensor is configured to detect externally-applied forces at a plurality of non-planar locations on the non-planar exterior through the deformable portion;
      a feedback generator; and
      means for determining a change in emotional state of the robot based on feedback from the touch sensor, and wherein the feedback generator is configured to generate feedback indicative of the change in emotional state.

19. The robot of claim 18, wherein the feedback generator comprises at least one of an auditory generator, tactile generator, and visual indicator.

20. The robot of claim 18, wherein the emotional state of the robot corresponds to a location in a multi-dimensional space.

* * * * *